United States Patent
Luo et al.

(10) Patent No.: US 6,859,230 B2
(45) Date of Patent: Feb. 22, 2005

(54) METHOD OF FAST AUTOMATIC EXPOSURE OR GAIN CONTROL IN A MOS IMAGE SENSOR

(75) Inventors: Xiaodong Luo, Sunnyvale, CA (US); Xinping He, San Jose, CA (US)

(73) Assignee: OmniVision Technologies, Inc., Sunnyvale, CA (US)

(*) Notice: Subject to any disclaimer, the term of this patent is extended or adjusted under 35 U.S.C. 154(b) by 668 days.

(21) Appl. No.: 10/005,776

(22) Filed: Nov. 7, 2001

(65) Prior Publication Data

US 2003/0086010 A1 May 8, 2003

(51) Int. Cl.[7] .................................. H04N 3/14
(52) U.S. Cl. ................ 348/297; 348/229.1; 348/255
(58) Field of Search .................... 348/362–366, 348/296–299, 229.1, 230.1, 255, 446

(56) References Cited

U.S. PATENT DOCUMENTS

| | | | |
|---|---|---|---|
| 5,194,960 A | 3/1993 | Ota | |
| 5,734,426 A | 3/1998 | Dong | |
| 5,917,372 A | * 6/1999 | Kakura et al. | ............... 330/129 |
| 6,151,073 A | 11/2000 | Steinberg et al. | |
| 6,782,063 B1 | * 8/2004 | Stevenson et al. | .......... 375/345 |
| 2002/0105581 A1 | * 8/2002 | Masaki et al. | ............ 348/229.1 |
| 2003/0098914 A1 | * 5/2003 | Easwar | ..................... 348/229.1 |

FOREIGN PATENT DOCUMENTS

| | | |
|---|---|---|
| EP | 0387817 A2 | 9/1990 |
| EP | 0583143 A2 | 2/1994 |
| EP | 0725536 A2 | 8/1996 |
| JP | 11284904 A * 10/1999 | .......... H04N/5/235 |
| WO | WO 02/056854 A1 | 7/2002 |

\* cited by examiner

*Primary Examiner*—Wendy R. Garber
*Assistant Examiner*—Timothy J. Henn
(74) *Attorney, Agent, or Firm*—Perkins Coie LLP

(57) ABSTRACT

In a CMOS image sensor, it is important to control the exposure time or gain. For varying changes in ambient light, the exposure time of the array must be changed. The present invention describes a method for controlling the exposure time or gain. Each of the intensities of the pixels in a frame is analyzed to provide an indication of the number of pixels having an intensity above or below multiple predetermined thresholds. This information is then used to change the exposure time. The magnitude of change in the exposure time is also determined by the number of pixels having an intensity above or below multiple predetermined thresholds, as the case may be.

14 Claims, 2 Drawing Sheets

METHOD OF FAST AUTOMATIC EXPOSURE OR GAIN CONTROL IN A MOS IMAGE SENSOR

TECHNICAL FIELD OF THE INVENTION

The present invention relates generally to CMOS image sensors, and more particularly, to a method of controlling an exposure time or gain of an image sensor.

BACKGROUND OF THE INVENTION

Integrated circuit technology has revolutionized various fields including computers, control systems, telecommunications, and imaging. For example, in the imaging field, CMOS image sensors have proved to be less expensive to manufacture relative to CCD imaging devices. Further, for certain applications CMOS devices are superior in performance. The pixel elements in a MOS device can be made smaller and therefore provide a higher resolution than CCD image sensors. In addition, the signal processing logic necessary can be integrated alongside the imaging circuitry, thus allowing for a single integrated chip to form a complete stand alone imaging device.

Examples of MOS imaging devices are detailed in "A ¼ Inch Format 250K Pixel Amplified MOS Image Sensor Using CMOS Process" by Kawashima et al., IEDM 93-575 (1993), and "A Low Noise Line-Amplified MOS Imaging Devices" by Ozaki et al., *IEEE Transactions on Electron Devices*, Vol. 38, No. 5, May 1991. In addition, U.S. Pat. No. 5,345,266 to Denyer titled "Matrix Array Image Sensor Chip" describes a MOS image sensor. CMOS image sensors are now available from a variety of manufacturers, including the assignee of the present invention, OmniVision Technologies, Inc.

The primary building block of an image formed by a CMOS image sensor is a pixel. The number, size and spacing of the pixels determine the resolution of the image generated by the imaging device. The pixels of a CMOS image sensor are semiconductor devices that transform incident light photons into current signals. The signal produced by each pixel is generally extremely small.

One important parameter that the CMOS image sensor must be able to control is the exposure time of each pixel to incident light. Similar to light exposure time for photographic film, the exposure time of each pixel must be adjusted to compensate for variations in lighting conditions, such as for indoor or outdoor lighting. An exposure time that is too long will result in an image that is overly bright and washed out. In contrast, an exposure time that is too short will result in an image that is dark and difficult to view.

Another method of varying the intensity of the pixel signals is to adjust the gain of the amplification circuitry. In many ways, controlling the gain is substantially similar to controlling the exposure time. By varying one or both, the image generated by the image sensor can be optimized for viewing.

U.S. Pat. No. 5,734,426 describes one prior art method of controlling exposure time. While adequate for many applications, the speed at which the exposure time can be automatically changed is insufficient for certain applications. For example, for automobile applications, where the automobile may travel from sunlight, to darkness (such as in a tunnel), back to sunlight, it is important for the image sensor to be able to adjust its exposure time quickly.

BRIEF DESCRIPTION OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
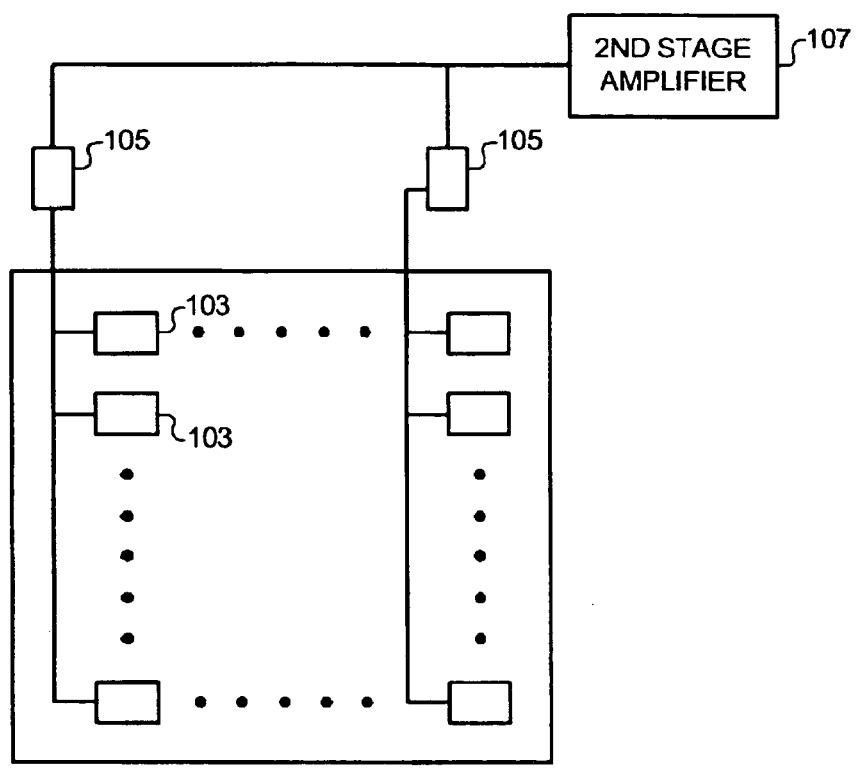
FIG. 1 is a schematic diagram of a CMOS image sensor.

With reference to FIG. 1, an architecture for a CMOS imaging array 101 includes a rectangular matrix of pixels 103. The number of pixels in the horizontal or x-direction, and the number of pixels in the vertical or y-direction, constitutes the resolution of the imaging array 101. Each of the pixels 103 in a vertical column routes its signal to a single charge amplifier 105.

The retrieval of information from the pixels 103 follows the well-known raster scanning technique. In particular, a row of pixels 103 is scanned sequentially from left to right. The next row is then scanned in this manner until all rows have been scanned sequentially from top to bottom. At the end of each complete scan of the entire array 101, a vertical blanking period of predetermined time occurs until the raster scanning pattern is repeated. This type of scanning follows the NTSC scanning scheme. Control circuitry of conventional design is operative to sequentially read the pixels 103 in this manner.

As each pixel is scanned, the signal from that pixel is provided to the charge amplifier 105 for that column. Thus, the charge amplifiers 105 receive signals sequentially. The sequential signals from the charge amplifiers 105 are then forwarded to a second-stage amplifier 107, which amplifies the signals so that they may be further processed. In various embodiments, either the column amplifier or the second-stage amplifier may be eliminated.

The present invention uses the magnitudes of the amplified signals from each of the pixels to determine the exposure time for each pixel. Generally speaking, the exposure time for each pixel can be varied by controlling the raster scan control algorithm.

Figure 2:
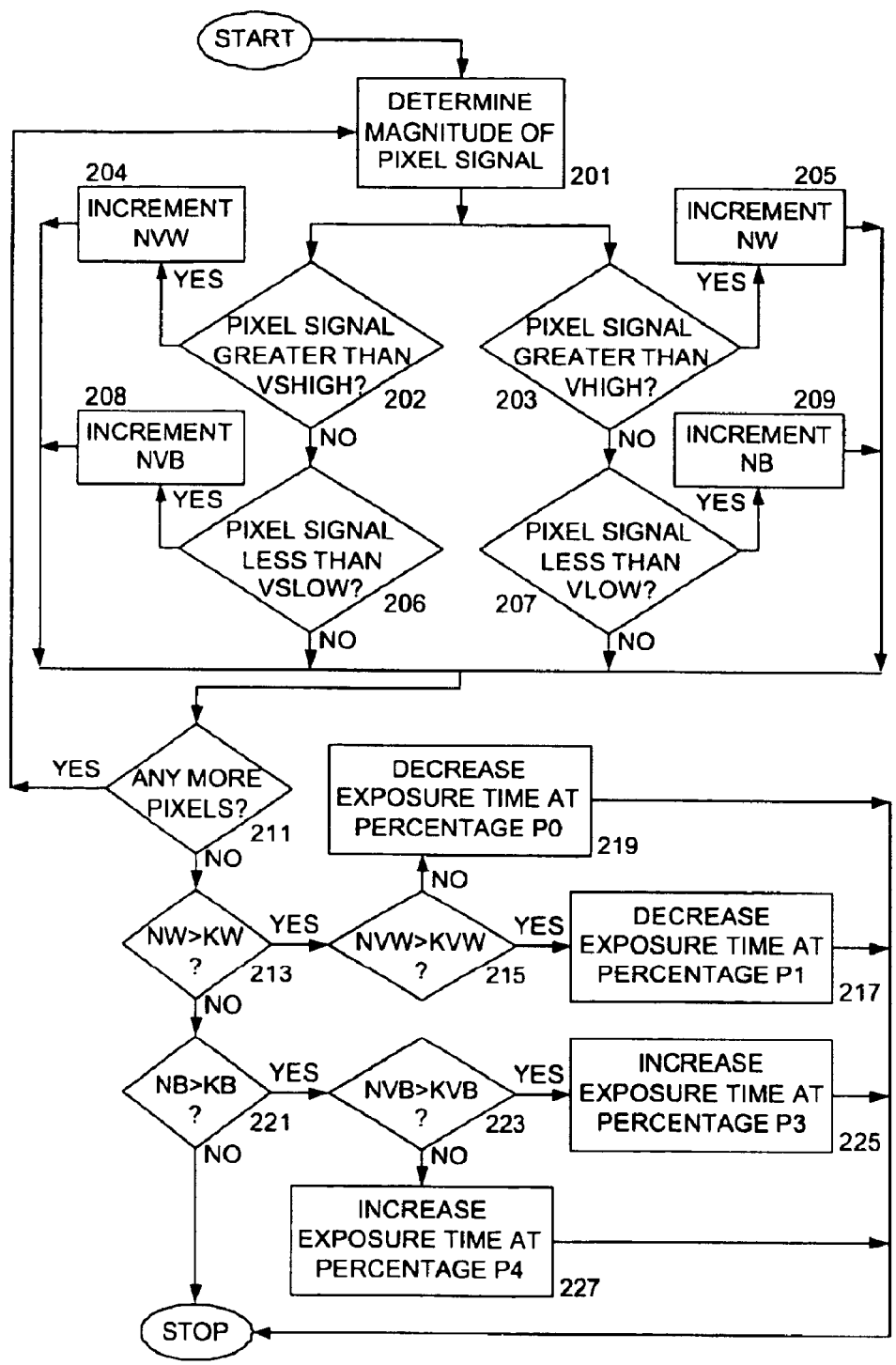
FIG. 2 is a flow diagram illustrating the method of the present invention.

The method of the present invention is shown in FIG. 2. While the following describes the method of the present invention in connection with controlling exposure time, the method applies equally well to controlling gain. At box 201, the magnitude of a pixel signal from a pixel in the array is determined. Next, at box 203, a determination is made as to whether the pixel signal is greater than a predetermined value VHIGH. Typically, the pixel signal will be between 0.3 volts and 1.0 volts. This voltage level is set by the NTSC television standard. However, it can be appreciated that the magnitude of the pixel signal may vary depending upon the particular types of pixels being used, the amount of amplification in the column amplifiers or second-stage amplifiers, and various other factors. Thus, the precise voltages given herein are simply examples and should not be construed as limiting.

In one embodiment, a typical value for VHIGH is 0.8 volts. If the magnitude of the pixel signal is greater than VHIGH, then at box 205 a counter, NW, is incremented by 1. After incrementing, the next step is at box 211.

However, if at box 203, the pixel signal is not greater than VHIGH, then, at box 207, a determination is made as to whether the pixel signal is less than another predetermined threshold value, VLOW. In one embodiment, VLOW is 0.5 volts. If the pixel signal is less than VLOW, then at box 209, a counter, NB, is incremented by 1. After box 209, control is provided to box 211.

While the process of boxes 203, 205, 207, and 209 is being conducted for a pixel signal, the same pixel signal is also being analyzed relative to a second set of "super" thresholds (hence the designation "S" in the threshold names). Specifically, at box 202, a determination is made as to whether the pixel signal is greater than a predetermined value VSHIGH. A typical value for VSHIGH is 0.9 volts. If the magnitude of the pixel signal is greater than VSHIGH, then at box 204 a counter, NVW, is incremented by 1. After incrementing, the next step is at box 211.

However, if at box 202, the pixel signal is not greater than VSHIGH, then, at box 206, a determination is made as to whether the pixel signal is less than another predetermined threshold value, VSLOW. In one embodiment, VSLOW is 0.4 volts. If the pixel signal is less than VSLOW, then at box 208, a counter, NVB, is incremented by 1. After box 208, control is provided to box 211.

Next, at box 211, a determination is made as to whether or not any more pixels in the frame still need to be analyzed. If so, the process of boxes 201–209 is repeated. It should be noted that it is not necessary to analyze all of the pixels in a frame. Indeed, a subset of the pixels in the frame may be analyzed. However, in one preferred embodiment, all of the pixels are analyzed. Thus, if the entire pixel array of the frame has been analyzed, then at box 213, a determination is made as to whether or not the counter NW is greater than a predetermined threshold value KW. Typically, KW is a number that is about 25% of the total number of pixels in the imaging array.

If NW is not greater than KW, then there is no decreasing of the exposure time, and control goes to box 221. However, if NW is greater than KW, then there is a need to decrease the exposure time. Recall that the counter NW indicates the number of pixels that are exhibiting high output signals, corresponding to a large amount of impinging light. If a large number of pixels exhibit high output signals, then this indicates that there may be an overly long exposure time. In such a case, the exposure time should be decreased.

In the prior art, after determining that NW is greater than KW, the exposure time is decreased by a predetermined decrease increment. Nevertheless, if the predetermined decrease increment is made too small, it may take several frames of image before the exposure is adequately corrected. However, if the predetermined decrease increment is set too high, then there may be an "overshoot" in the amount of decrease in exposure time and the video stream may appear "jumpy".

In any event, in order to improve upon the prior art automatic exposure correction technique, in accordance with the present invention, a second step in the analysis takes place to determine an appropriate magnitude of the decrease to exposure time. Specifically, at box 215, a determination is made as to whether or not the counter NVW is greater than a threshold value KVW. If so, then at box 217, the exposure time is decreased by a first predetermined decrease increment. In one embodiment, the first predetermined decrease increment is defined as a percentage (P1) of the exposure time. However, if the counter NVW is not greater than the threshold value KVW, then at box 219, the exposure time is decreased by a second predetermined decrease increment. In one embodiment, the second predetermined decrease increment is defined as a percentage (P2) of the exposure time. Typically, P1 is greater than P2, and in one embodiment, P1 is 50 percent and P2 is 6 percent.

Thus, to summarize, if it is determined that a large number of pixels are outputting high signal levels (NW>KW), then the exposure time should be decreased. A next process takes place to determine the magnitude by which the exposure time should be decreased, P1 or P2. For this analysis, the counter NVW (which measures the number of pixels that output a signal above a "super" threshold) is used. Specifically, if the counter NVW is greater than a threshold number KVW, then a larger decrease in the exposure time is warranted. If the counter NVW is not greater than KVW, then a smaller decrease in the exposure time is used.

A similar process is followed for increasing the exposure time. Thus, if at box 213, NW is not greater than KW, then at box 221, a determination is made as to whether or not the counter NB is greater than a predetermined threshold value KB. Typically, KB is a number that is about 75% of the total number of pixels in the imaging array.

If NB is not greater than KB, then there is no increasing of the exposure time. However, if NB is greater than KB, then there is a need to increase the exposure time. Recall that the counter NB indicates the number of pixels that are exhibiting low output signals, corresponding to a small amount of impinging light. If a large number of pixels exhibit low output signals, then this indicates that there may be an overly short exposure time. In such a case, the exposure time should be increased.

In the prior art, after determining that NB is greater than KB, the exposure time is increased by a predetermined increase increment. Nevertheless, if the predetermined increase increment is made too small, it may take several frames of image before the exposure is adequately corrected. However, if the predetermined increase increment is set too high, then there may be an "overshoot" in the amount of increase in exposure time and the video stream may appear "jumpy".

In any event, in order to improve upon the automatic exposure correction technique, in accordance with the present invention, a second step in the analysis takes place to determine an appropriate magnitude of the increase to exposure time. Specifically, at box 223, a determination is made as to whether or not the counter NVB is greater than a threshold value KVB. If so, then at box 225, the exposure time is increased by a first predetermined increase increment. In one embodiment, the first predetermined increase increment is defined as a percentage (P3) of the exposure time. However, if the counter NVB is not greater than the threshold value KVB, then at box 227, the exposure time is increased by a second predetermined decrease increment. In one embodiment, the second predetermined decrease increment is defined as a percentage (P4) of the exposure time. Typically, P3 is greater than P4, and in one embodiment, P3 is 100 percent and P4 is 6 percent.

Thus, to summarize, if it is determined that a large number of pixels are outputting low signal levels (NB>KB), then the exposure time should be increased. A next process takes place to determine the magnitude by which the exposure time should be increased, P3 or P4. For this analysis, the counter NVB (which measures the number of pixels that output a signal below a "super" threshold) is used. Specifically, if the counter NVB is greater than a threshold number KVB, then a larger increase in the exposure time is warranted. If the counter NVB is not greater than KVB, then a smaller increase in the exposure time is used.

It can be appreciated that the method of FIG. 2 is typically implemented on the image sensor integrated circuit. In particular, most image sensor chips include a sensor array and processor circuitry. The processor circuitry, in one example, may be programmed to perform the analysis detailed in FIG. 2.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. For example, the above detailed description has been given in terms of adjusting the exposure time. However, the techniques described above apply equally to gain control. For example, instead of increasing or decreasing the amount of exposure, the amount of gain can be similarly increased or decreased. Still further, both the exposure time and gain can be increased or decreased as the need may be. Thus, the scope of the invention is indicated by the appended claims rather than by the foregoing description, and all changes which come within the meaning and range of equivalency of the claims are intended to be embraced therein.

What is claimed is:

1. A method of automatically controlling the exposure time of an image sensor, said image sensor including a matrix of pixels, said method comprising:
    determining a value NW as the number of pixels in said matrix that output a pixel signal greater than a value VHIGH;
    determining a value NB as the number of pixels in said matrix that output a pixel signal less than a value VLOW;
    determining a value NVW as the number of pixels in said matrix that output a pixel signal greater than a value VSHIGH;
    determining a value NVB as the number of pixels in said matrix that output a pixel signal less than a value VSLOW;
    determining if NW is greater than a first predetermined high threshold KW, and if so:
        determining if NVW is greater than a second predetermined high threshold KVW, and if so, decreasing said exposure time by a first decrease percentage P1, but if not, decreasing said exposure time by a second decrease percentage P2; and
    determining if NB is greater than a first predetermined low threshold KB, and if so:
        determining if NVB is greater than a second predetermined low threshold KVB, and if so, increasing said exposure time by a first increase percentage P3, but if not, increasing said exposure time by a second increase percentage P4.

2. The method of claim 1 wherein VSLOW is less than VLOW and further wherein VSHIGH is greater than VHIGH.

3. The method of claim 1 wherein said first decrease percentage P1 is greater than said second decrease percentage P2.

4. The method of claim 3 wherein P1 is about 50 percent and P2 is about 6 percent.

5. The method of claim 1 wherein said first increase percentage P3 is greater than said second increase percentage P4.

6. The method of claim 5 wherein P3 is about 100 percent and P4 is about 6 percent.

7. The method of claim 1 wherein said predetermined values of KB and KW are about 75% and 25% of the total number of pixels in said matrix.

8. A method of automatically controlling the amplification gain of an image sensor, said image sensor including a matrix of pixels, said method comprising:
    determining a value NW as the number of pixels in said matrix that output a pixel signal greater than a value VHIGH;
    determining a value NB as the number of pixels in said matrix that output a pixel signal less than a value VLOW;
    determining a value NVW as the number of pixels in said matrix that output a pixel signal greater than a value VSHIGH;
    determining a value NVB as the number of pixels in said matrix that output a pixel signal less than a value VSLOW;
    determining if NW is greater than a first predetermined high threshold KW, and if so:
        determining if NVW is greater than a second predetermined high threshold KVW, and if so, decreasing said amplification gain by a first decrease percentage P1, but if not, decreasing said amplification gain by a second decrease percentage P2; and
    determining if NB is greater than a first predetermined low threshold KB, and if so:
        determining if NVB is greater than a second predetermined low threshold KVB, and if so, increasing said amplification gain by a first increase percentage P3, but if not, increasing said amplification gain by a second increase percentage P4.

9. The method of claim 8 wherein VSLOW is less than VLOW and further wherein VSHIGH is greater than VHIGH.

10. The method of claim 8 wherein said first decrease percentage P1 is greater than said second decrease percentage P2.

11. The method of claim 10 wherein P1 is about 50 percent and P2 is about 6 percent.

12. The method of claim 8 wherein said first increase percentage P3 is greater than said second increase percentage P4.

13. The method of claim 12 wherein P3 is about 100 percent and P4 is about 6 percent.

14. The method of claim 8 wherein said predetermined values of KB and KW are about 75% and 25% of the total number of pixels in said matrix.

* * * * *